Patented Jan. 6, 1953

2,624,749

UNITED STATES PATENT OFFICE 2,624,749

STABLE LIQUID ORGANOSILOXANES

Raymond H. Bunnell, Toledo, Ohio, assignor to Libbey-Owens-Ford Glass Company, Toledo, Ohio, a corporation of Ohio No Drawing. Application April 11, 1950,
Serial No. 155,345

14 Claims. (Cl. 260—448.8)

1

The invention relates to the production of stable liquid organosiloxanes from monoalkylsilanes.

Stable liquid organosiloxanes are of great commercial importance because their viscosity remains relatively constant with changes in temperature, and because they are resistant to heat and oxidation. Among the known stable liquid organosiloxanes are the silicone oils, which have been found to be of great value for use as hydraulic fluids, damping fluids and lubricating oils.

The one great disadvantage which has seriously restricted the use of silicone oils and other stable liquid organosiloxanes is their high cost. The fundamental reason for the high cost of such liquids is that heretofore it has been possible to prepare such liquids only from silanes whose molecule has two hydrocarbon radicals directly attached to the silicon atom. Such silanes are much more expensive than monoalkylsilanes, which are relatively cheap materials that are produced by the reaction of silicochloroform with an olefin.

The principal object of the invention is the production of novel stable liquid organosiloxanes that are inexpensive because they can be produced at very low cost from monoalkylsilanes. More specific objects and advantages are apparent from the description, which illustrates and discloses but is not intended to limit the invention.

United States Patent No. 2,415,389 shows an example of the type of stable liquid organosiloxane heretofore known. The organosiloxane shown in that patent has the general formula:

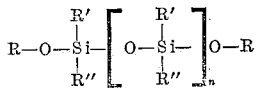

In this general formula each of the radicals R is a hydrocarbon radical. The foregoing general formula is typical of the structure of the stable liquid organosiloxanes heretofore known in that every silicon atom in the stable liquid organosiloxanes heretofore known had two organic radicals connected to it through carbon atoms. Thus, the only starting materials from which the stable liquid organosiloxanes heretofore known could be produced were silanes having two organic radicals connected to each silicon atom through carbon atoms. The fact that such silanes are relatively expensive materials is the reason for the costliness of the stable liquid organosiloxanes heretofore known.

2

United States Patent No. 2,258,218 shows why a stable methyl silicone oil cannot be produced by hydrolyzing a mixture of a monomethylsilane and a dimethylsilane. The hydrolysis of a dimethylsilane alone forms chain molecules, but the presence of even a small proportion of a monomethylsilane in the composition that is hydrolyzed causes cross-linking of the chains in the manner shown on page 2 of the patent. As disclosed by the patent, the hydrolysis of a mixture of a monomethylsilane and a dimethylsilane produces a cross-linked resin that progressively hardens when heated.

It has been found that when a monoethylsilane or higher monoalkylsilane is hydrolyzed in admixture with a diethylsilane or higher dialkylsilane, intercondensation of the products of the hydrolysis of the monoalkylsilane with the products of the hydrolysis of the dialkylsilane takes place only to a limited extent. The products of the hydrolysis of the dialkylsilane are largely converted to volatile cyclic condensation products of low molecular weight, whereas the monoalkylsilane undergoes separate hydrolysis and condensation to a highly cross-linked siloxane. The cyclic condensation products formed from the dialkylsilane are lost by volatilization, leaving only the highly cross-linked siloxane formed from the monoalkylsilane. Severe shrinkage and cracking takes place during volatilization of the cyclic condensation products, and the brittle residue that remains is of little or no practical value.

Although all of the stable liquid organosiloxanes heretofore known have had two organic radicals connected through carbon atoms to each silicon atom, the novel stable liquid organosiloxane of the present invention has only one organic radical connected through a carbon atom to each silicon atom. The stable liquid organosiloxanes of the present invention are much less expensive than those heretofore known because the starting materials for the production of the present organosiloxanes are monoalkylsilanes, which are much cheaper than the starting materials from which it was necessary to produce the stable liquid organosiloxanes heretofore known.

The present invention is based upon the discovery of a heretofore unknown class of stable liquid organosiloxanes having the empirical formula $$RSi(Or)_nO_{\left(\frac{3-n}{2}\right)}$$

wherein $n$ is a number from $\frac{1}{3}$ to 1; $R$ is a monovalent organic radical in which the free valence is connected to an acyclic carbon atom to which at least one hydrogen atom is attached, and in which any atom other than carbon and hydrogen is a halogen having an atomic weight less than 80 that is attached to a carbon atom other than one connected to said acyclic carbon atom; and $r$ is a monovalent organic radical in which the free valence is connected to an aliphatic carbon atom to which at least one hydrogen atom is attached, and in which any atom other than carbon and hydrogen is a halogen having an atomic weight less than 80.

The organosiloxanes of the invention usually occur as mixtures of such organosiloxanes. The organosiloxanes of the present invention also may be contained in a mixture with other organosiloxanes which are miscible with the present organosiloxanes. The organosiloxanes of the invention are oils which have the empirical formula hereinbefore defined.

The fact that monoalkylsilanes can be used to produce organosiloxanes of the invention which are oils, unlike the cross-linked resins heretofore obtained from the hydrolysis of monoalkylsilane starting materials, is demonstrated as follows:

Ethyltrichlorosilane (1 mol) and a solvent (200 ml. of carbon tetrachloride) are mixed in a 2 liter three-necked flask fitted with a stirrer, a reflux condenser and a dropping funnel. A mixture of 1-butanol (0.8 mol) and water (1.2 mols) is placed in the dropping funnel and added dropwise over a period of one hour to the silane solution in the flask. The mixture in the flask is stirred during the addition. When the addition is complete, the mixture is refluxed for seven hours. The mixture in the flask is then transferred to a Claisen distillation apparatus and is distilled at atmospheric pressure to remove carbon tetrachloride and excess 1-butanol. The residue is then distilled under reduced pressure to obtain a fraction (40 grams) boiling at temperatures ranging up to 250 degrees C. at 3 mm. Hg (i. e., boiling at temperatures ranging up to 250 degrees C. at an absolute pressure of 3 mm. of mercury). The material remaining in the distillation flask is a slightly yellow-colored oil, which can be decolorized by adding 10 grams of "Darco" (a commercial charcoal decolorizing agent) and filtering. The filtrate is a water white oil embodying the invention, having a viscosity of 825 centistokes at 25 degrees C. When heated for several days in an open beaker at 150° C., this oil undergoes slight loss in weight and a very gradual increase in viscosity, but does not gel.

When the procedure described in the preceding paragraph is repeated using ethanol in place of the 1-butanol, a liquid having the following empirical formula is obtained:

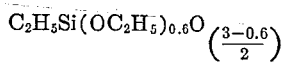

Such liquid is also heat-stable oil embodying the present invention. In contrast, the material having the following empirical formula

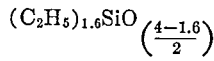

is a resin.

The latter empirical formula is the same as the preceding formula except that in the latter formula the ethoxy groups of the preceding formula are replaced by ethyl groups. The latter formula represents a resin obtained by the hydrolysis of a mixture of a monoethylsilane and a diethylsilane, for example by the following typical procedure:

A mixture of ethylsilanes (62.4 grams of diethyldichlorosilane and 262.4 grams of ethyltrichlorosilane) is dissolved in a solvent (200 ml. of isopropyl ether). This solution is poured slowly with stirring over about 400 grams of a cracked ice slurry. When the addition of the silane solution is complete (from about 5 to about 10 minutes after the addition is started), the reaction mixture is stirred for about 10 minutes, and the ether layer is separated in a separatory funnel. The ether layer is washed with water, separated from the washings and dried over anhydrous sodium sulfate for about one hour. The sodium sulfate is removed (by filtration) from the solution of hydrolyzed silanes; the ether is distilled by heating on a steam bath until the temperature of the liquid rises a few degrees above the boiling point of the isopropyl ether; and this temperature is maintained for about five minutes at an absolute pressure of about 4 inches of mercury to remove the last of the solvent. The material so obtained is a resin which gels and hardens when heated for five minutes at a temperature of about 150 degrees C. If the proportion of diethyldichlorosilane to ethyltrichlorosilane is reduced, or if such ethylchlorosilanes are replaced by the corresponding methylchlorosilanes, the resulting resin gels even more rapidly.

It is very difficult to prepare the organosiloxanes of the present invention by mere partial hydrolysis of a silane. It has been found to be very difficult to control the hydrolysis of a silane so as to secure the desired degree of partial hydrolysis. However, it has been found that the organosiloxanes of the invention can be prepared readily by reacting an alcohol and water simultaneously in the desired proportions with a trihalosilane such as an alkyltrihalosilane.

The term "organosiloxane" is used herein to mean a substance whose molecule contains two or more silicon atoms connected by oxygen linkage (i. e.,

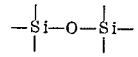

linkage), at least one organic radical being attached to at least one of said silicon atoms by a

linkage.

*Molecular structure of the organosiloxane*

The molecular structure of a stable liquid organosiloxane embodying the invention is predominantly a chain, a ring or a chain of rings, depending upon the proportions of alcohol and water employed per mole of silane starting material in the production of such an organosiloxane by simultaneously reacting alcohol, water and a trihalosilane. That is, in the empirical formula for a stable liquid organosiloxane embodying the invention, the oxygen atoms which connect silicon atoms by

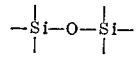

linkage are derived from the hydrolysis of part of the halogen atoms in the organotrihalosilane starting material, and average from 1 to 1⅓ per silicon atom in accordance with the amount of water that is reacted per mol of organotrihalosilane. Similarly, a monovalent organic radical (r) which is connected to silicon through an oxygen atom is derived from the reaction of an alcohol with a halogen atom in the organotrihalosilane starting material that is not hydrolyzed by the water. Such radicals average from ⅓ to 1 in number per silicon atom (i. e., n is from ⅓ to 1 in the empirical formula for an organosiloxane of the invention) in accordance with the proportion of alcohol that reacts per mole of silane. If n in the empirical formula for an organosiloxane of the invention were 2, the organosiloxane would be a disiloxane whose structure is represented by the following formula:

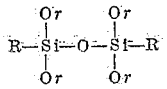

It is believed that if n in the empirical formula were slightly more than 1, some of the organosiloxane molecules in a mixed organosiloxane would be in the form of rings and some would be in the form of chains, the rings predominating as n more nearly approaches 1. When n in the empirical formula is exactly 1, the theoretical molecular structure of the organosiloxane of the invention is a ring containing six or more members. Such a ring, containing six members, is represented by the following structural formula:

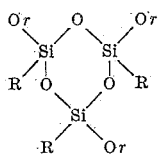

When n in the empirical formula is less than 1, the molecules of a mixed organosiloxane of the invention are believed to consist of rings and chains of rings, the radical

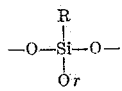

being present both in the rings and in chains connecting rings. As n decreases and approaches ⅓, the molecules of a mixed organosiloxane of the invention are believed to comprise predominantly chains of rings as represented by the following structure (along with some chains of larger rings):

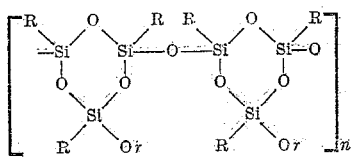

"Aliphatic radical" is used hereinafter to include straight, branched or closed chain monovalent aliphatic radicals having saturated

bonds. "Acyclic radical" is used hereinafter to include straight or branched chain monovalent aliphatic radicals having saturated

bonds. "Aliphatic carbon atom" as used herein means a carbon atom which is contained in an aliphatic radical or in the aliphatic part of an aryl-substituted aliphatic radical. "Acyclic carbon atom" as used herein means a carbon atom which is not contained in a ring system, i. e., is contained in an acyclic radical or in the acyclic part of an aryl-substituted acyclic radical. A monovalent organic radical in which the free valence is connected to an acyclic carbon atom to which at least one hydrogen atom is attached, and in which any atom other than carbon and hydrogen is a halogen having an atomic weight less than 80 that is attached to a carbon atom other than one connected to said acyclic carbon atom (R in the empirical formula), that is contained in the molecule of a stable liquid organosiloxane embodying the invention may be (1) an unsubstituted primary or secondary acyclic radical having from 1 to 18 carbon atoms (i. e., methyl, ethyl, propyl, isopropyl, n-butyl, isobutyl, secondary butyl, or any primary or secondary alkyl radical having from 5 to 18 carbon atoms); (2) an aralkyl radical which consists of an acyclic radical as described in (1) above in which one hydrogen atom has been replaced by an aromatic radical having from one to three benzene nuclei containing from 6 to 18 carbon atoms (e. g., radicals of the benzene, naphthalene, anthracene, phenanthrene, diphenyl or terphenyl series), having a total of not more than 20 nuclear and side chain carbon atoms, having not more than five side chains (each of which may consist of an aliphatic radical containing not more than 6 carbon atoms), and having no substituents or having from one to five nuclear substituents each of which is a halogen of atomic weight less than 80 (i. e., chlorine bromine or fluorine) (such aromatic radicals include phenyl, tolyl, xylyl, ethylphenyl, mesityl, methylethylphenyls, n-propylphenyl, propylphenyl, isopropylphenyl, diethylphenyls, pentamethylphenyl, amylphenyls, butylmethylphenyls, propyldimethylphenyls, propylethylphenyls, ethyltrimethylphenyls, diethylmethylphenyls, hexylphenyl, cyclohexylphenyl, amylmethylphenyl, butylethylphenyl, butyldimethylphenyl, propylethylmethylphenyl, diphenyl, dipropylphenyls, naphthyl, 1-methylnaphthyl, 2-methylnaphthyl, 1-ethylnaphthyl, 2-ethylnaphthyl, phenylnaphthyl, anthracyl, 9-methylanthracyl, 2,3-dimethylanthracyl, 2,4 - dimethylanthracyl, 9 - ethylanthracyl, bromophenyl, o-bromotolyl, m-bromotolyl, p-bromotolyl, o-chlorotolyl, m-chlorotolyl, p-chlorotolyl, 2-chloro-m-fluorotolyl, 2,6-dichlorotolyl, 4-bromo-o-xylyl, dichloroxylyl, 5-bromo-m-xylyl, 2-bromo-p-xylyl, 2-bromo-mesityl, 3-bromo-o-tolyl, 2-bromo-1-ethylphenyl, 4-bromo-1,3-diethylphenyl, 6-bromo-3-ethyltolyl, 2-bromo-4-ethyltolyl, 4-bromo-1-propylphenyl, 4-bromo-1-isopropylphenyl, 4-bromo-1-methyl-3-isopropylphenyl, 4-bromo-1-tertiary-butylphenyl, 4-bromo-1-tertiaryamylphenyl, chlorophenyl, alpha-bromonaphthyl, beta-bromonaphthyl, 2-chloronaphthyl, 1-bromo-3-chloronaphthyl, 2-chloro-1-methylnaphthyl, 1-bromo-8-methylnaphthyl, 1 - bromo - 2,3 - dimethylnaphthyl, 1 - bromo-4-methylnaphthyl, 1,10-dibromoanthracyl, 9,10-dichloroanthracyl, phenanthryl, 3-methylphenanthryl, and 1,4-dimethylphenanthryl); or (3) a radical as described in (1) or (2) above in which from one to three hydrogen atoms attached to acyclic carbon atoms (other than a carbon atom connected to the carbon atom to which is connected the free valence) have been replaced by halogen atoms having an atomic weight less than 80 (such radicals include alpha-halo- and gamma-halo-substituted propyl, alpha-halo, gamma-halo-, and delta-halo-substituted butyl, but not beta-halo-substituted propyl or butyl, for reasons hereinafter discussed).

A monovalent organic radical in which the free valence is connected to an aliphatic carbon atom to which at least one hydrogen atom is attached, and in which any atom other than carbon and hydrogen is a halogen having an atomic weight less than 80 ($r$ in the empirical formula) which is connected to silicon through an oxygen atom in the molecule of a stable liquid organosiloxane embodying the invention, may be an unsubstituted straight or branched chain primary or secondary aliphatic radical having from 1 to 20 carbon atoms (i. e., methyl, ethyl, propyl, isopropyl, n-butyl, isobutyl, secondary butyl, or any primary or secondary alkyl radical having from 5 to 20 carbon atoms); an unsubstituted closed chain aliphatic radical having 5 or 6 carbon atoms, in which a hydrogen atom is attached to the carbon atom to which is attached the free valence (i. e., a cyclopentyl or cyclohexyl radical) or a mono-, di- or tri-alkyl-substituted cyclopentyl or cyclohexyl radical, each alkyl substituent being a primary, secondary or tertiary alkyl radical having from one to four carbon atoms, and the total number of carbon atoms in the alkyl substituents being not more than four; an aryl-substituted aliphatic radical which consists of an aliphatic radical as described above in which one hydrogen atom has been replaced by an aromatic radical (as hereinbefore described); or a halo-substituted aliphatic radical consisting of any aliphatic or aryl-substituted aliphatic radical described above in which one hydrogen atom attached to an aliphatic carbon atom has been replaced by a halogen atom having an atomic weight less than 80 (hereinafter referred to as a "haloaliphatic" radical).

*Properties of the organosiloxane*

Ordinarily, hydrolysis of trifunctional silanes produces polymeric compounds which are either solid gels or resinous substances that are readily hardened upon heating. An alkoxy group attached to silicon is ordinarily considered to be a hydrolyzable group, and in compounds such as methyltriethoxysilane and ethyltriethoxysilane the hydrolysis of the ethoxy group takes place quite readily. U. S. Patent No. 2,441,098 discloses a method of producing thermally stable liquid methyl silicon oxide copolymers which comprises hydrolyzing a mixture of, for example, dimethyldiethoxysilane and trimethylethoxysilane in the presence of an alkali metal hydroxide. The patent states that there may be present in the final product "a few remaining unhydrolyzed ethoxy radicals, usually less than 1 for about 100 siloxane linkages, or the like, or some uncondensed hydroxyl groups, usually less than 1 for about 400 siloxane linkages, but not in sufficient amounts to impair the properties of the liquid products." Compounds embodying the invention are unusual in that they are liquids although they are produced by the hydrolysis (and subsequent condensation) of trifunctional silanes to a degree which would be expected to give resins, and furthermore in that they contain from ⅓ to 1 alkoxy, cycloalkoxy or aralkoxy groups per silicon atom and yet are stable to further hydrolysis or to condensation by heat.

Stable liquid organosiloxanes of the invention range from compounds of very low viscosity to compounds of such high viscosity that they are almost non-flowing, but nevertheless, the highly viscous compounds of the invention are still liquids which are stable in that they are not hardened or gelled by heat. Compounds embodying the invention whose molecules are rings or chains of rings as hereinbefore described (i. e., compounds in the empirical formula for which $n$ is from ⅓ to 1) are usually oils, which are far more useful than the more volatile, low molecular weight compounds whose molecules are chains (i. e., compounds in the empirical formula for which $n$ is greater than 1). It is believed that in the ring and linked-ring molecules the structure is such that the alkoxy (or aralkoxy or cycloalkoxy) groups are "protected" so that these groups are more resistant to hydrolysis or to condensation by heat than such groups contained in linear molecules such as the simple disiloxanes.

The presence of cyclic radicals (e. g., cycloalkoxy, aralkoxy or aralkyl radicals) in the molecules of stable liquid organosiloxanes of the invention tends to raise the viscosity-temperature coefficients of such compounds. Thus, in the empirical formula for the preferred compounds of the invention each of the radicals R and $r$ is an acyclic radical. It is preferred also that R and $r$ be primary acyclic radicals since organosiloxane oils in which the monovalent radicals are primary acyclic radicals possess better properties (i. e., greater stability to heat and oxidation and lower viscosity-temperature coefficients) than oils in which the monovalent radicals are secondary acyclic radicals. Furthermore, it is desirable that R and $r$ be primary acyclic hydrocarbon radicals, since oils whose molecules contain such radicals are prepared from less expensive starting materials than oils whose molecules contain halo-substituted acyclic radicals.

Organosiloxane oils whose molecules contain methyl and methoxy radicals are much less stable to hydrolysis than those oils whose molecules contain ethyl and ethoxy radicals, so that each of the radicals R and $r$ in the empirical formula for the more desirable compounds of the invention has at least two carbon atoms. However, although an ethyl radical attached to a silicon atom imparts greater stability toward hydrolysis to an alkoxy group attached to the same silicon atom than a methyl radical, and although an ethoxy group is somewhat more stable toward hydrolysis than a methoxy group, by far the most desirable organosiloxane oils of the invention are those having the empirical formula hereinbefore described in which each of the radicals R and $r$ is a primary acyclic hydrocarbon radical having at least four carbon atoms. Alkyl radicals (R) having at least four carbon atoms tend to increase the resistance to hydrolysis of alkoxy groups (O$r$) in alkylalkoxysilanes much more than alkyl radicals having two or three carbon atoms. Furthermore, alkoxy groups having more than four carbon atoms are more stable to hydrolysis than ethoxy or propoxy groups. Thus, the molecules of the most stable, and therefore, the most useful organosiloxane oils of the invention contain n-butyl radicals or higher primary alkyl radicals and n-butoxy radicals or higher primary alkoxy radicals. For example, compounds of the invention having the empirical formula

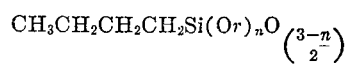

wherein $n$ is a number from ⅓ to 1, and $r$ is a primary acyclic hydrocarbon radical having at least four carbon atoms, have been found to have very good properties, and of these compounds the ones having the empirical formula

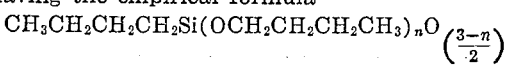

wherein $n$ is a number from ⅓ to 1 having particularly desirable properties.

For the sake of brevity, organosiloxanes of the invention may be hereinafter referred to as alkyl (or aralkyl) alkoxy (or cycloalkoxy) siloxanes (e. g., when each of the radicals R and $r$ in the empirical formula is an ethyl radical, the organosiloxane will be referred to as an ethylethoxysiloxane) although such nomenclature does not, of course, identify the actual molecular structure of the compounds but only serves to identify the starting materials from which they are derived).

Since an ethyl radical is not as effective as a butyl radical in increasing the resistance to hydrolysis of alkoxy groups, it is sometimes difficult to obtain a high viscosity oil whose molecules contain ethyl radicals without getting some gel particles during preparation, and there is sometimes a tendency for a resin to form instead of an oil. The difference in hydrolytic stability between organosiloxane oils of the invention whose molecules contain butyl radicals and those whose molecules contain ethyl radicals is demonstrated by the following tests:

Normal sodium hydroxide (50 ml.) is heated in a 150 ml. flask, fitted with a reflux condenser, to a temperature of about 100 degrees C. A sample of an ethylbutoxysiloxane of the invention (20 grams of the ethylbutoxysiloxane oil having a viscosity of 825 centistokes at 25 degrees C., prepared as hereinbefore described) is then added through the condenser, and the mixture is refluxed with stirring for seven hours. The mixture is then cooled and the organic layer is separated from the water layer in a separatory funnel. The water layer is then saturated with potassium carbonate and extracted several times with diethyl ether. The combined ether extracts and organic layer are then evaporated until the temperature of the liquid in the evaporating flask is approximately 190 degrees C., to remove ether, water and other volatile material. The residue remaining after the evaporation of the volatile material is 97 per cent by weight of the original sample, but this residue is a tacky resin instead of the original oil. Apparently sufficient hydrolysis occurs to change the oil to a resin.

A butylbutoxysiloxane oil is prepared by the procedure hereinbefore described for the preparation of an ethylbutoxysiloxane, except that butyltrichlorosilane is used in place of ethyltrichlorosilane, and an additional portion of 1-butanol (25 grams) is added after two hours of refluxing. After distilling off carbon tetrachloride and excess 1-butanol at atmospheric pressure, the residue is distilled under reduced pressure to separate low molecular weight organosiloxanes (39 grams), boiling at temperatures in a range up to 250 degrees C. at 1 mm. Hg. The organosiloxane oil remaining in the flask (280 grams) is decolorized by adding "Darco" (10 grams) and filtering. The resulting water white oil has a viscosity of 237 centistokes at 25 degrees C.

A sample of the butylbutoxysiloxane oil prepared as described in the preceding paragraph is tested for hydrolytic stability by heating with normal sodium hydroxide, using the procedure described above. The sample is 100 per cent recovered, and, although there is an increase in viscosity of about 65 per cent, the material recovered is nevertheless an oil and not a resin.

Not only is the stability of the organosiloxanes of the invention, having ring and linked-molecular structures, sufficiently good to make them useful as dashpot oils, damping fluids, hydraulic fluids, instrument oils, etc., but such oils are also much less expensive to produce than dialkyl silicone oils. The stable organosiloxane oils embodying the invention have lower viscosity-temperature coefficients than hydrocarbon oils, possess very good resistance to oxidation and hydrolysis in air or in water at room temperature, and even possess good resistance to hydrolysis after standing a week in water that is maintained at a temperature of approximately 100 degrees C. Such oils are useful under ordinary atmospheric conditions in all applications which require a non-corrosive stable oil with a good viscosity-temperature coefficient.

At high temperatures the organosiloxane oils of the invention possess better heat stability under vacuum (or in an inert atmosphere) than when exposed to air, since alkyl, aralkyl and alkoxy (and cycloalkoxy and aralkoxy) radicals attached to silicon are oxidized in air. An oxidation inhibitor, such as tertiary butyl catechol or other higher boiling inhibitor, may be used to improve the heat stability of the organosiloxane oils in air at elevated temperatures.

*Preparation of the organosiloxane*

Stable liquid organosiloxanes embodying the invention can be produced by the method of the invention, which comprises preparing a stable liquid organosiloxane having the empirical formula $$RSi(Or)_nO_{\left(\frac{3-n}{2}\right)}$$

as hereinbefore defined, by reacting simultaneously (a) water; (b) a monohydric alcohol in which at least one hydrogen atom is attached to the same carbon atom as the hydroxy radical, and in which any substituent other than the hydroxy radical consists of a halogen having an atomic weight less than 80; and (c) a substance whose molecule consists of a silicon atom to which are attached three halogen atoms each having an atomic weight less than 80, and (as hereinbefore defined) a monovalent organic radical in which the free valence is connected to an acyclic carbon atom to which at least one hydrogen atom is attached, and in which any atom other than carbon and hydrogen is a halogen having an atomic weight less than 80 that is attached to a carbon atom other than one connected to said acyclic carbon atom. The method of the invention can also be used to produce the more volatile, low molecular weight organosiloxanes whose molecules are chains (i. e., compounds in the empirical formula for which $n$ is from more than 1 to 2).

A monohydric alcohol (b), which is used in the present method, may be a substance whose molecule consists of an aliphatic, aryl-substituted aliphatic or halo-substituted aliphatic radical (r) as hereinbefore described, connected to a hydroxy radical. Such alcohols include: methanol, ethanol, 1- and 2-propanol, 1- and 2-butanol, 2-methyl, 1-propanol, 1-, 2- and 3-pentanol, 1-, 2- and 3-hexanol, 1- and 2-heptanol, 1-, 2-, 3- and 4-octanol, 1- and 2-nonanol, 1- and 2-decanol, 1- and 4-dodecanol, 1-tetradecanol, 1-hexadecanol, 1-octadecanol, 2-ethyl-1-hexanol, 1-eicosanol, cyclohexanol, 2,6-dimethylcyclohexanol, benzyl alcohol, 2-phenyl-2-propanol, 1-phenyl-1-propanol, 1-phenyl-2-butanol, 2 - phenyl - 1 - butanol, 2 - methyl - 2 - phenyl-1-butanol, 3-phenyl-4-octanol, 1-naphthaleneëthanol, beta - chloro - 1 - naphthalene-propanol, 2 - bromo - ethanol, 3 - bromo - 1 - propanol, 3-chloro-1-propanol, 1-chloro-2-propanol, 4 - chloro - 1 - butanol, 5-bromo-1-pentanol, 6-bromo-1-hexanol, 6-chloro-1-hexanol, 2-chlorocyclohexanol, 2 - isopropyl-5-methyl-cyclohexanol, and alpha-methyl-1-naphthalenemethanol.

A substance (c) which is used in the method of the invention, (or mixture of such organotrihalosilane) may be any organotrihalosilane in which (1) the organo radical that is attached to silicon is a monovalent organic radical whose free valence is connected to an acyclic carbon atom to which at least one hydrogen atom is attached, and in which any atom other than carbon and hydrogen is a halogen having an atomic weight less than 80 that is attached to a carbon atom other than one connected to said acyclic carbon atom (as hereinbefore defined) and in which (2) the three halogens attached to silicon consists of chlorine, bromine, or fluorine. Such organotrihalosilanes include: methyltrichlorosilane, methyltribromosilane, methyltrifluorosilane, ethyltrichlorosilane, ethylfluorodichlorosilane, n-propyltrichlorosilane, i-propyltrichlorosilane, n-butyltrichlorosilane, secondary butyltrichlorosilane, n - butyl - difluorochlorosilane, n-butylfluorodichlorosilane, isobutyltrichlorosilane, n-pentyltrichlorosilane, isopentyltrichlorosilane, n-hexyltrichlorosilane, n-octyltrichlorosilane, n-decyltrichlorosilane, n-dodecyltrichlorosilane, n-tetradecyltrichlorosilane, n-hexadecyltrichlorosilane, n-octadecyltrichlorosilane, benzyltrichlorosilane, alpha - chloroethyltrichlorosilane, alpha-chloropropyltrichlorosilane, gamma-chloropropyltrichlorosilane, gamma-chlorobutyltrichlorosilane, delta - chlorobutyltrichlorosilane, alpha-chlorobutyltrichlorosilane, alpha-(trichlorophenyl) ethyltrichlorosilane, beta - (trichlorophenyl)-ethyltrichlorosilane, gamma-tolylpropyltrichlorosilanes, gamma - tolylbutyltrichlorosilanes, beta - phenylethyltrichlorosilane, beta-tolylbutyltrichlorosilanes, beta-tolylpropyltrichlorosilanes, beta-phenylpropyltrichlorosilane, beta-(chlorophenyl)ethyltrichlorosilanes, alpha-tolylethyltrichlorosilanes, and beta-tolylisobutyltrichlorosilanes.

The aralkyltrihalosilanes mentioned above, as well as other aralkyltrihalosilanes that may be used in the present method, may be prepared by reacting the corresponding haloalkyltrihalosilane with an aromatic hydrocarbon, in the presence of an aluminum halide catalyst in which each halogen atom has an atomic weight between 35 and 80 (i. e., chlorine or bromine). In such a reaction, the halogen atom is split out of the haloalkyl radical in the silane molecule and a hydrogen atom is split out of the aromatic nucleus in the aromatic hydrocarbon molecule so that the two reacting molecules are linked into a single molecule by a —C—C— bond. It is preferred that the molar ratio of the aromatic compound to the haloalkyltrihalosilane be approximately 3 to 1, and that the proportion of the aluminum halide catalyst be between .75 and 2 mol per cent (based on the amount of the haloalkyltrihalosilane present in the reaction mixture). Usually, about ¼ to ⅓ of the total amount of the aluminum halide is added very carefully at room temperature to the mixture of silane and aromatic hydrocarbon, which is then heated for about 20 minutes. The remainder of the aluminum halide is then added in portions large enough to maintain a fairly vigorous rate of reaction, with heating between additions, and after the entire amount of the aluminum halide has been added, the reaction mixture is refluxed for the length of time necessary to complete the reaction and drive off HCl. When the reaction goes rather slowly, the heating may be continued while the remainder of the aluminum halide is added in small portions. It is usually desirable to remove the aluminum halide catalyst before distillation to obtain the pure aralkyltrihalosilane. Aluminum chloride may be removed by adding phosphorus oxychloride to the reaction mixture. The phosphorus oxychloride binds the aluminum chloride by reacting with it to form a stable complex. An amount of phosphorus oxychloride equivalent to the amount of aluminum chloride present in the reaction mixture (or in slight excess over the amount of aluminum chloride) is added to the reaction mixture when the mixture has cooled to a temperature slightly below the boiling point of phosphorus oxychloride (107° C.). After further cooling an amount of a hydrocarbon solvent equal to the volume of the reaction mixture is added to precipitate the AlCl₃.POCl₃ complex. Such hydrocarbon solvents include pentane, ligroin and petroleum ethers. The mixture is allowed to stand over night, and the solid complex is filtered from the solution or the liquid to be distilled is decanted from the mixture, leaving a residue containing the AlCl₃.POCl₃ complex. An absorbing agent such as kieselguhr may be added in place of or in addition to the hydrocarbon solvent to absorb the AlCl₃.POCl₃ complex, and after the reaction mixture cools to room temperature the liquid to be distilled may be filtered from the absorbed complex. There is less chance that aluminum chloride will distill with the product when it is in the form of a complex than when it is in the free state, and when this complex is relatively non-volatile as compared to the organosilane product the product may be distilled under reduced pressure in the presence of the AlCl₃.POCl₃ complex.

Organotrihalosilanes used in the practice of the present invention may not contain beta-halosubstituted aliphatic radicals, for under the reaction conditions of the present method halo radicals in the beta-position on such radicals are readily removed, with splitting off of an olefin from the silane molecule. It is preferred that the halogens attached to silicon in the molecule of an organotrihalosilane starting material be chlorine since trichlorosilanes are most readily available.

In the practice of the invention, a diorganodihalosilane, a triorganohalosilane or a silicon tetrahalide may be substituted for part of the organotrihalosilane, provided that the proportion of water is adjusted so that there is a mol of water for every two equivalents of halogen in such substances. Of course, in order to obtain liquid organosiloxanes having essentially the empirical formula hereinbefore described, no substantial quantities of such silanes should be used. Ordinarily, it is undesirable to use even small amounts of such di- or tri-organosilanes because they are more expensive than organotrihalosilanes so that their use increases the cost of the organosiloxane product. Furthermore, the reaction of such "impurities" in the present method is much more difficult to control so that the present method cannot be conducted as efficiently as it can when the silane starting materials comprise only organotrihalosilanes. Silicon tetrachloride, for example, presents difficulty in that it is so low boiling that its vapor forms a film over the other reactants, and as it hydrolyzes, it plugs up the passages through which the water and alcohol are added.

In the practice of the present method, water, a monohydric alcohol and an organotrihalosilane are reacted simultaneously to produce a stable liquid organosiloxane. If the water were reacted with the silane first without the alcohol, the resulting product might be a gel which would not then react with the alcohol. If the alcohol were reacted with the silane first without the water, a monomeric alkoxysilane would result which would be very difficult to hydrolyze only partially in order to obtain an organosiloxane of the invention.

Theoretically, the hydrolysis of the halo radicals in a mol of an organotrihalosilane requires 1½ mols of water (i. e., one molecule of water hydrolyzes two halo radicals). When the proportion of water in the mixture of the water and the alcohol that is simultaneously reacted with the trihalosilane is less than 1½ mols per mol of trihalosilane, the halo radicals that are not hydrolyzed by this insufficient quantity of water react with the alcohol (one molecule of the alcohol reacts with one halo radical) with the evolution of a hydrogen halide. When the proportion of water in the mixture of water and alcohol is from ½ to 1⅓ mols per mol of organotrihalosilane, and the proportion of alcohol is at least sufficient to react with the halo radicals that are not hydrolyzed by the water, the product obtained from the reaction is a stable liquid organosiloxane whose molecules are rings or chains of rings embodying the invention, having the empirical formula hereinbefore defined or is a stable liquid organosiloxane whose molecules are chains, having the empirical formula hereinbefore defined except that $n$ in the formula is from more than 1 to 2.

The molecular structure (as hereinbefore discussed) of stable liquid organosiloxanes embodying the invention varies in accordance with the proportion of water employed in their preparation by the method of the invention. The preferred method of producing stable liquid organosiloxanes comprises preparing a stable liquid organosiloxane embodying the invention having the empirical formula hereinbefore defined in which $n$ is a number from ⅓ to 1. Thus, the preferred proportion of water in the mixture of water and alcohol is from 1 to 1⅓ mols per mol of organotrihalosilane. When the proportion of water is 1⅓ mols per mol of organotrihalosilane, a highly viscous liquid which is almost non-flowing is obtained. The viscosity of the organosiloxane oils obtained when the water to silane ratio is decreased from 1⅓ to 1 decreases as the ratio decreases. Thus the proportion of water is important in the production of oils embodying the invention having a specific viscosity. This is particularly true when the molar ratio of water to silane is within the range 1.2 to 1.3, for large increases in the viscosity of the oil are obtained for slight increases in the proportion of water employed in its production. For example, when the molar ratio of water to butyltrichlorosilane in a reaction with 1-butanol conducted in accordance with the present method is 1.25, a stable organosiloxane oil having a viscosity of about 800 centistokes (at 25 degrees C.) is obtained, while a molar ratio of 1.2 produces an oil having a viscosity of about 235 centistokes (at 25 degrees C.).

The proportion of an alcohol employed in the preparation of an organosiloxane of the invention is at least the theoretical amount required to react with all of the halo radicals that are not hydrolyzed by the water (for example, with the maximum proportion of water, i. e., 1⅓ mol per mol of silane, the proportion of the alcohol is at least ⅓ mol, and with the minimum proportion of water, i. e., ½ mol per mol of silane, the proportion of the alcohol is at least 2 mols). Ordinarily it is preferable to use the alcohol in an excess over the theoretical amount required to produce the desired organosiloxane, since the halo radicals are less reactive with the alcohol than with the water. Although any desired excess of the alcohol over the theoretical amount, e. g., from approximately a 25 per cent to approximately a 100 per cent excess, may be employed, it is ordinarily desirable to use about a 50 per cent excess over the theoretical amount of the alcohol.

A mixture of the alcohol and the water is usually added to a solution of the organotrihalosilane (as hereinbefore discussed). The rate of addition of the alcohol-water mixture is limited only by the vigor with which the substances react, and so long as hydrogen chloride is not evolved too vigorously, it may be as rapid as possible. Although the reaction proceeds slowly at room temperature, it is desirable to reflux the mixture (until the evolution of hydrogen chloride ceases) to bring the reaction to completion as rapidly as possible.

Although the proportion of the alcohol in the mixture of the alcohol and the water may be in excess of the theoretical amount required, it is preferable that it be either the theoretical amount or slightly less at the beginning of the reaction, and that the reaction mixture be refluxed for from two to three hours to insure complete reaction of all the water before adding more alcohol (either an amount in excess of the theoretical amount or a quantity sufficient to bring the initial proportion up to the theoretical amount). Preferably the refluxing is then continued to complete the reaction with the alcohol of all the halo radicals that are not hydrolyzed by the water.

The alcohol and the water preferably are present in a one-phase system so that they react simultaneously with the organotrihalosilane. When the molar ratio of water to silane is low (e. g., less than 1.2 to 1), the mixture of the alcohol and the water is ordinarily a one-phase system. With higher ratios of water to silane, it is usually desirable to add any inert solvent which is miscible with water and which is not too high boiling to be practical (since it must be separated from the organosiloxane product by distillation), in an amount sufficient to make the alcohol-water mixture a one-phase system. Such inert solvents include: dioxane, and dialkyl ethers of diethylene glycol such as the diethyl and dibutyl ethers of diethylene glycols.

In the practice of the invention, the alcohol-water mixture is added to the silane, which usually is in solution in a solvent. Although the usual solvents for such silanes may be used, e. g., hydrocarbon solvents such as benzene and toluene, it is far more desirable to use a solvent in which the hydrogen halide formed during the present reaction is insoluble, so that it can be easily removed before it can exert any undesirable effect (e. g., by reaction with alkoxy groups attached to silicon atoms in the molecules of the organosiloxane). Such a solvent should not be too high boiling, since it must be separated from the organosiloxane product by distillation, and it should be capable of being distilled at atmospheric pressure without appreciable decomposition. Suitable solvents are halo-substituted alkanes having from one to three carbon atoms and having at least three halo-substituents whose atomic weight is between 35 and 80 (i. e., chlorine and bromine). Such solvents include: carbon tetrachloride, chloroform, 1,1,2-trichloroethane, 1,1,2,2-tetrachloroethane, pentachloroethane, 1,1,2-trichloropropane, 1,2,2-trichloropropane, 1,2,3-trichloropropane, and bromoform. Carbon tetrachloride is a most desirable solvent since it is readily available, and a hydrogen halide, e. g., hydrogen chloride, has very low solubility in it. The hydrogen chloride is expelled in the anhydrous form as soon as it is formed, and may be collected and reused, for example in the production of silicochloroform.

Since the alcohol used in the present method acts as a solvent for the hydrogen halide, the volume of solvent for the silane preferably is at least equal to the volume of alcohol, and may be as large as is economically feasible. Ordinarily it is desirable to use approximately 200 grams of solvent per mol of silane.

Stable liquid organosiloxanes are obtained from the reaction mixture by distillation, after removal of excess solvents. Those organosiloxanes that are colored my be decolorized by treatment with charcoal and filtering. It is preferable to use glass jointed apparatus in the practice of the present method, since rubber stoppers swell badly in the vapor from a solvent such as carbon tetrachloride, and produce color in the reaction mixture that is difficult to remove.

Stable liquid organosiloxanes of the invention may be prepared by methods other than the method of the invention. For example, organosiloxanes of the invention may be prepared by the hydrolysis of an alkylalkoxydihalosilane (using a hydrolysis medium such as water or sodium bicarbonate solution) but it is difficult to control such hydrolysis, and resins are usually obtained instead of oils. Stable liquid organosiloxane oils of the invention may be prepared by procedures such as the following:

*Example 1*

An alkylalkoxydihalosilane is prepared as follows: An alkyltrihalosilane (576 grams of n-butyltrichlorosilane) and a solvent (450 grams of carbon tetrachloride) are mixed in a 2 liter three-necked flask fitted with a mercury-sealed stirrer, a reflux condenser and a dropping funnel. A monohydric alcohol (185 grams of 1-butanol) is place in the dropping funnel and added dropwise with stirring over a period of 45 minutes to the silane solution in the flask. The mixture is then stirred and refluxed for two hours before it is distilled at atmospheric pressure through a four-foot column packed with glass helices. N-butylbutoxydichlorosilane (B. P. 203–204 degrees C. at 756 mm. Hg.) is obtained from the distillation after recovering carbon tetrachloride and excess n-butyltrichlorosilane.

Using the apparatus described in the preceding paragraph, a mixture of water (9 grams), pyridine (79 grams) and dioxane (1.5 grams) is added dropwise with stirring over a period of 45 minutes to a solution of an alkylalkoxydihalosilane (114.5 grams of the n-butylbutoxydichlorosilane prepared as described in the preceding paragraph) in dioxane (150 grams). After refluxing the mixture with stirring for six hours, it is allowed to stand until pyridine hydrochloride precipitates. The pyridine hydrochloride is filtered off, and the filtrate, which is yellow in color, is poured into water (1 liter). The yellow oil which forms on the surface of the water is separated from the water in a separatory funnel and dried over sodium sulphate (25 grams). The resulting oil embodying the invention is moderately viscous.

A much more satisfactory procedure for the preparation of organosiloxanes of the invention is a procedure embodying the method of the present invention, as shown in the following examples:

*Example 2*

(a) An alkyltrihalosilane (1.5 mols of n-butyltrichlorosilane) and a solvent (250 grams of carbon tetrachloride) are mixed in a 2 liter three-necked flask fitted with a stirrer, a reflux condenser and a dropping funnel. A mixture of an alcohol (2.7 mols of 1-butanol) and water (1 mol) is placed in the dropping funnel and added dropwise with stirring over a period of one hour to the silane solution in the flask. When the addition is complete, the mixture is refluxed until the evolution of hydrogen chloride ceases. The reaction mixture in the flask is then transferred to a Claisen distillation apparatus and is distilled at atmospheric pressure to remove carbon tetrachloride and excess 1-butanol. Fractional distillation of the residue under reduced pressure yields four fractions as follows: (1) 75 grams, B. P. 115–175 degrees C. at 1 mm. Hg (comprising liquid organosiloxanes); (2) 54 grams, B. P. 175–200 degrees C. at 1 mm. Hg; (3) 47 grams, B. P. 200–225 degrees C. at 1 mm. Hg; and (4) 75 grams, B. P. 225–280 degrees C. at 1 mm. Hg. A residue of 10 grams remains in the distillation flask. The organosiloxane fractions that have a slight straw color are decolorized by adding "Darco" (10 grams), and then filtering to obtain water white liquids or low viscosity. The viscosity of fraction (3) is 10.2 centistokes and that of fraction (4) is 27.7 centistokes (determined by means of calibrated Ostwald-Fenske ASTM pipettes Series 300 and 400, at 25 degrees C.).

(b) Using the procedure and apparatus described in (a), a mixture of an alcohol (1.3 mols of 1-butanol) and water (1-mol) is added dropwise to a solution of n-butyltrichlorosilane (3 mols) in carbon tetrachloride (200 grams). When the addition is complete, the mixture is refluxed for seven hours. Carbon tetrachloride and excess 1-butanol are then distilled at atmospheric pressure. The residue is then distilled under reduced pressure to remove low molecular weight liquid organosiloxanes boiling at temperatures ranging between 115 and 275 degrees C. at 1 mm. Hg. The organosiloxane oil remaining in the distillation flask is decolorized with "Darco." The resulting water white oil has a viscosity of 144 centistokes at 25 degrees C.

A sample of the oil prepared by the procedure described in the preceding paragraph (20 grams) is mixed with water (100 grams) and the mixture is allowed to stand for 70 days at room temperature. At the end of this period, the oil is separated from the water, and dried, and its viscosity is determined. No change in viscosity is detected.

(c) Using the procedure and apparatus described in (a), a mixture of an alcohol (2.4 mols of 1-butanol) and water (3.6 mols) is added dropwise to a solution of n-butyltrichlorosilane (3 mols) in carbon tetrachloride (600 grams). When the addition is complete, the mixture is refluxed for two hours before adding additional 1-butanol (75 grams) and continuing the refluxing for five more hours. Carbon tetrachloride and excess 1-butanol are then distilled at atmospheric pressure. The residue is then distilled under reduced pressure to obtain low molecular weight organosiloxanes (119 grams) boiling at temperatures ranging up to 250 degrees C. at 1 mm. Hg. The organosiloxane oil remaining in the distillation flask (280 grams) is decolorized with "Darco." The resulting water white oil has a viscosity of 237 centistokes at 25 degrees C.

A sample of the organosiloxne oil having a viscosity of 237 centistokes, prepared as described in the preceding paragraph, (20 grams) is placed in a beaker, which is covered with a watch glass and allowed to stand under laboratory atmospheric conditions (in the presence of hydrogen chloride vapors) for 70 days. At the end of this period no change in viscosity of the oil or in its color can be detected.

A second sample of the organosiloxane oil prepared as described above (20 grams) is mixed with water (100 grams) in a 500 ml. flask fitted with a reflux condenser. The flask is immersed in a boiling water bath for seven days. At the end of this period the oil is separated from the water and dried and its viscosity is determined. Only slight hydrolysis of the oil has taken place, as indicated by a viscosity increase of 20.4 per cent.

A third sample of the organosiloxane oil prepared as described above (20 grams) is placed in an open beaker in an oven at a temperature of 150 degrees C. At the end of 24 hours the viscosity of the oil has increased by 32.8 per cent and there is a loss in weight of 0.5 per cent. Another sample of the organosiloxane oil when placed in an open beaker in a circulating air oven at 70 degrees C. for 24 hours shows no increase in viscosity.

(d) Using the apparatus and procedure described in (a), a mixture of an alcohol (96 grams of 1-butanol), water (3.75 mols) and dioxane (30 ml.) is added dropwise to a solution of n-butyltrichlorosilane (3 mols) in carbon tetrachloride (600 grams). When the addition is complete, the reaction mixture is refluxed for two hours before adding additional 1-butanol (100 grams) and continuing the refluxing for six more hours. Carbon tetrachloride and excess 1-butanol are then distilled at atmospheric pressure. The residue is then distilled under reduced pressure to obtain small quantities of low molecular weight organosiloxanes boiling at temperatures ranging up to 280 degrees C. at 3 mm. Hg. The organosiloxane oil remaining in the distillation flask is decolorized with "Darco." The resulting water white oil has a viscosity of 800 centistokes at 25 degrees C.

Two samples (20 grams each) of the organosiloxane oil having a viscosity of 800 centistokes, prepared as described in the preceding paragraph, are placed in small beakers. An oxidation inhibitor (0.2 gram of tertiary butyl catechol) is added to one sample. The beakers are placed in an oven at a temperature of 140 degrees C. for 24 hours. At the end of this period, the sample containing no t-butyl catechol is colorless but shows an increase in viscosity of 45 per cent, whereas the sample containing the oxidation inhibitor has a slight straw color but shows only a 25 per cent increase in viscosity.

(e) Using the apparatus and procedure described in Example 1, a mixture of an alcohol (64 grams of 1-butanol), water (3.99 mols) and dioxane (30 ml.) is added dropwise to a solution of n-butyltrichlorosilane (3 mols) in carbon tetrachloride (600 grams). When the addition is complete, the reaction mixture is refluxed for two hours before adding additional 1-butanol (100 grams) and continuing the refluxing for eight more hours. Carbon tetrachloride and excess 1-butanol are then distilled at atmospheric pressure. The residue is then distilled under reduced pressure to obtain small quantities of low molecular weight organosiloxanes boiling at temperatures ranging up to 260 degrees C. at 3 mm. Hg. The residue remaining in the flask is an organosiloxane oil of very high viscosity.

*Example 3*

Using the apparatus and procedure described in Example 2 (a), a mixture of an alcohol (100 grams of 1-butanol) and water (1 mol) is added dropwise to a solution of an alkyltrihalosilane (1 mol of n-hexyltrichlorosilane) in carbon tetrachloride (200 grams). When the addition is complete, the reaction mixture is refluxed for seven hours. Carbon tetrachloride and excess 1-butanol are then distilled at atmospheric pressure. The residue is distilled under reduced pressure to obtain low molecular weight organosiloxanes (55 grams), boiling at temperatures ranging up to 250 degrees C. at 1 mm. Hg. The organosiloxane oil remaining in the distillation flask (124 grams) is decolorized with "Darco." The viscosity of the resulting colorless oil is 79.5 centistokes at 25 degrees C.

*Example 4*

(a) Using the apparatus and procedure described in Example 2 (a), a mixture of an alcohol (100 grams of 1-butanol) and water (1 mol) is added dropwise to a solution of an alkyltrihalosilane (1 mol of ethyltrichlorosilane) in carbon tetrachloride (200 grams). When the addition is complete, the reaction mixture is refluxed for seven hours. Carbon tetrachloride and excess 1-butanol are then distilled at atmospheric pressure. The residue is distilled under reduced pressure to obtain low molecular weight organosiloxanes (100 grams), boiling at temperatures ranging up to 250 degrees C. at 1 mm. Hg. The organosiloxane oil remaining in the distillation flask (124 grams) is decolorized with "Darco" (10 grams). The viscosity of the resulting colorless oil is 100 centistokes at 25 degrees C.

(b) Using the apparatus and procedure described in Example 2 (a), a mixture of an alcohol (0.8 mol of 1-butanol) and water (1.2 mols) is added dropwise to a solution of ethyltrichlorosilane (1 mol) in carbon tetrachloride (200 grams). When the addition is complete, the mixture is refluxed for seven hours. Carbon tetrachloride and excess 1-butanol are then distilled at atmospheric pressure. The residue is then distilled under reduced pressure to yield low molecular weight organosiloxanes (40 grams) boiling at temperatures ranging up to 250 degres C. at 3 mm. Hg. The organosiloxane oil remaining in the distillation flask is decolorized with "Darco" (10 grams). The resulting water white oil has a viscosity of 825 centistokes at 25 degrees C.

Example 5

(a) Using the apparatus and procedure described in Example 2 (a), a mixture of an alcohol (96 grams of 1-butanol), water (1 mol) and dioxane (30 ml.) is added dropwise to a solution of an alkyltrihalosilane (3 mols of secondary butyltrichlorosilane) in carbon tetrachloride (600 grams). When the addition is complete, the reaction mixture is refluxed for two hours before adding additional 1-butanol (100 grams), stirring and continuing the refluxing for seven more hours. Carbon tetrachloride and excess 1-butanol are then distilled at atmospheric pressure. The residue is distilled under reduced pressure to obtain low molecular weight organosiloxanes boiling at temperatures ranging up to 275 degrees C. at 4 mm. Hg. The organosiloxane oil remaining in the distillation flask is decolorized with "Darcol." The viscosity of the resulting colorless oil is 2680 centistokes at 25 degrees C.

(b) Using the apparatus and procedure described in Example 2 (a), a mixture of an alcohol (47.5 grams of 1-butanol), water (47.9 grams) and dioxane (30 ml.) is added dropwise to a solution of secondary butyltrichlorosilane (2 mols) in carbon tetrachloride (400 grams). When the addition is complete, the reaction mixture is refluxed for one hour before adding additional 1-butanol (50 ml.), and containing the refluxing for 16 more hours. Excess 1-butanol and carbon tetrachloride are then distilled at atmospheric pressure. The residue is distilled under reduced pressure to obtain low molecular weight organosiloxanes boiling at temperatures ranging up to 200 degrees C. at 5 mm. Hg. The material remaining in the flask is an organosiloxane oil of very high viscosity.

molecular weight organosiloxanes boiling in a range up to 225 degrees C. at 5 mm. Hg. The material remaining in the distillation flask is treated with "Darco" (10 grams), and filtered. The filtrate is a light straw colored organosiloxane oil having a viscosity of 306 centistokes at 25 degrees C.

Stable liquid organosiloxanes embodying the invention have viscosity-temperature coefficients that are better than those of conventional hydrocarbon oils. The viscosity-temperature coefficients of some of the organosiloxane oils prepared according to the procedures hereinbefore described are compared with the viscosity temperature coefficients of various hydrocarbon oils in Table 1. For the sake of brevity, the organosiloxane oils are named in column 1 of Table 1 simply as alkylalkoxysiloxanes and are further identified by the number of the example in which their preparation is given. The viscosity temperature coefficients shown in column 6 are obtained using the following relationship:

$$VTC = \frac{n37.8°C. - n100°C.}{n37.8°C}$$

wherein $n$ is the coefficient of viscosity. Viscosities measured at temperatures other than 37.8 degrees C. and 100 degrees C. may be used to solve the following viscosity equation for the constants A and B:

$$\log n = \frac{A}{T} + B$$

(wherein $T$ is the absolute temperature) so that the viscosities at 37.8 degrees C. and 100 degrees C. can be calculated by inserting the values for the constants and solving the viscosity equation for the coefficient of viscosity, $n$, at those temperatures.

Table 1

| Material | Viscosity (Centistokes) | | | Viscosity Equation | Viscosity Temperature Coefficient |
|---|---|---|---|---|---|
| | 0° C. | 25° C. | 100° C. | | |
| Butylbutoxysiloxane, Example 2(b) | 372 | 144 | 23.9 | $\log n = \frac{1225}{T} - 1.91$ | 0.78 |
| Butylbutoxysiloxane, Example 2(c) | | 237 | 33.6 | $\log n = \frac{1260}{T} - 1.85$ | 0.79 |
| Butylbutoxysiloxane, Example 2(d) | | 800 | 100 | $\log n = \frac{1318}{T} - 1.50$ | 0.81 |
| Ethylbutoxysiloxane, Example 4(a) | | 100 | 36.3 | $\log n = \frac{1107}{T} - 1.72$ | 0.75 |
| Ethylbutoxysiloxane, Example 4(b) | | 825 | 95.5 | $\log n = \frac{1387}{T} - 1.73$ | 0.82 |
| Sec. butylbutoxysiloxane, Example 5(a) | | 2680 | 149 | $\log n = \frac{1865}{T} - 2.83$ | 0.90 |
| Butyl-2-pentoxysiloxane, Example 6 | | 306 | 36.7 | $\log n = \frac{1365}{T} - 2.1$ | 0.805 |
| Castor Oil | | 738 | 19.3 | $\log n = \frac{2352}{T} - 5.01$ | 0.95 |
| Dioctyl phthalate | 334 | 56.2 | | $\log n = \frac{2518}{T} - 6.70$ | 0.96 |
| "Socony Vacuum DTE, Heavy Medium" (a hydraulic oil) | | 140 | 7.1 | $\log n = \frac{1920}{T} - 4.29$ | 0.91 |

Example 6

Using the apparatus and procedure described in Example 2 (a), a mixture of an alcohol (0.6 mol of 2-pentanol), water (1.2 mols) and dioxane (30 ml.) is added dropwise to a solution of an alkyltrihalosilane (1 mol of n - butyltrichlorosilane) in carbon tetrachloride (200 grams). When the addition is complete, the reaction mixture is refluxed for one hour before adding additional 2-pentanol (50 ml.) and refluxing for 16 more hours. Excess 2-pentanol and carbon tetrachloride are then distilled at atmospheric pressure. The residue is then distilled under reduced pressure to obtain low

I claim:

1. A stable liquid organosiloxane having the empirical formula

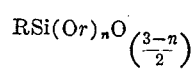

wherein $n$ is a number from one-third to one; R is a monovalent organic radical having no olefinic unsaturation in which the free valence is connected to an acylic carbon atom to which at least one hydrogen atom is attached, and in which any atom other than carbon and hydrogen is a halogen having an atomic weight less than 80 that is attached to a carbon atom other than one connected to said acylic carbon atom; and r is a monovalent organic radical having no olefinic unsaturation in which the free valence is connected to an aliphatic carbon atom to which at least one hydrogen atom is attached, and in which any atom other than carbon and hydrogen is a halogen having an atomic weight less than 80.

2. A stable liquid organosiloxane as claimed in claim 1 wherein each of the radicals R and r is an acyclic radical.

3. A stable liquid organosiloxane as claimed in claim 1 wherein each of the radicals R and r is a primary acyclic radical.

4. A stable liquid organosiloxane having the empirical formula $$RSi(Or)_nO_{\left(\frac{3-n}{2}\right)}$$

wherein $n$ is a number from one-third to one and each of the radicals R and r is a primary acyclic hydrocarbon radical having no olefinic unsaturation.

5. A stable liquid organosiloxane having the empirical formula $$RSi(Or)_nO_{\left(\frac{3-n}{2}\right)}$$

wherein $n$ is a number from one-third to one and each of the radicals R and r is a primary acyclic hydrocarbon radical having at least two carbon atoms and having no olefinic unsaturation.

6. A stable liquid organosiloxane having the empirical formula $$RSi(Or)_nO_{\left(\frac{3-n}{2}\right)}$$

wherein $n$ is a number from one-third to one and each of the radicals R and r is a primary acyclic hydrocarbon radical having at least four carbon atoms and having no olefinic unsaturation.

7. A stable liquid organosiloxane having the empirical formula $$CH_3CH_2CH_2CH_2Si(Or)_nO_{\left(\frac{3-n}{2}\right)}$$

wherein $n$ is a number from one-third to one, and r is a primary acyclic hydrocarbon radical having at least four carbon atoms and having no olefinic unsaturation.

8. A stable liquid organosiloxane having the empirical formula $$CH_3CH_2CH_2CH_2Si(OCH_2CH_2CH_2CH_3)_nO_{\left(\frac{3-n}{2}\right)}$$

wherein $n$ is a number from one-third to one.

9. A method of producing stable liquid organosiloxanes that comprises reacting simultaneously (a) from ½ to 1⅓ mols of water, (b) 1 mol of a substance whose molecule contains no olefinic unsaturation and consists of a silicon atom to which are attached three halogen atoms each having an atomic weight less than 80, and a monovalent organic radical in which the free valence is connected to an acyclic carbon atom to which at least one hydrogen atom is attached, and in which any atom other than carbon and hydrogen is a halogen atom having an atomic weight less than 80 that is attached to a carbon atom other than one connected to said acyclic carbon atom and (c), in an amount at least sufficient to replace all the halogen atoms of (b) that are not removed by reaction with (a), a monohydric alcohol, having no olefinic unsaturation, in which at least one hydrogen atom is attached to the same carbon atom as the hydroxy radical, and in which any substituent other than the hydroxy radical consists of a halogen having an atomic weight less than 80.

10. A method as claimed in claim 9 wherein (a) and (c) are in a single phase.

11. A method as claimed in claim 10 wherein (b) is dissolved in a solvent in which a hydrogen halide is insoluble.

12. A method as claimed in claim 9 wherein (c) is a primary alcohol.

13. A method as claimed in claim 12 wherein the amount of (c) used is from 25 to 100 per cent in excess of the minimum specified.

14. A method as claimed in claim 9 wherein the amount of (a) is from 1 to 1⅓ mols.

RAYMOND H. BUNNELL.

REFERENCES CITED

The following references are of record in the file of this patent:

UNITED STATES PATENTS

| Number | Name | Date |
|---|---|---|
| 2,398,672 | Sauer | Apr. 16, 1946 |
| 2,415,389 | Hunter | Feb. 4, 1947 |
| 2,481,349 | Robie | Sept. 6, 1949 |

OTHER REFERENCES

Andrianov (2), Jour. Gen. Chem., (USSR), vol. 8 (1938), 1255–63, Translation, 11 pp., received March 21, 1945.

Andrianov (2), Jour. Gen. Chem., (USSR), vol. 16 (1946), 639–46, Translation, 12 pp., received December 6, 1948.